United States Patent [19]
Offermann

[11] Patent Number: 4,737,036
[45] Date of Patent: Apr. 12, 1988

[54] DEVICE FOR WHIPPING CREAM OR EGG WHITES OR FOR PREPARING MAYONNAISE

[76] Inventor: Axel Offermann, 5880 Lüdenscheid, Fed. Rep. of Germany

[21] Appl. No.: 875,320

[22] Filed: Jun. 16, 1986

[30] Foreign Application Priority Data

Jun. 14, 1985 [DE] Fed. Rep. of Germany ....... 3521384

[51] Int. Cl.⁴ .............................................. B01F 11/00
[52] U.S. Cl. .................................... 366/130; 366/256; 366/260; 366/316; 366/334
[58] Field of Search ................ 366/129, 130, 255–257, 366/332–334, 293, 260, 315, 316

[56] References Cited
U.S. PATENT DOCUMENTS 3,140,078  7/1964  Krahe et al. ......................... 366/256

FOREIGN PATENT DOCUMENTS 333081  2/1921  Fed. Rep. of Germany ...... 366/256

*Primary Examiner*—Timothy F. Simone
*Attorney, Agent, or Firm*—Michael J. Striker

[57] ABSTRACT

A device for whipping cream or egg whites having a cup-shaped cylindrical housing with a preformed bottom, a cap releasably locking the open top, a perforated plunger piston connected to one end of the piston rod and movable within the housing, the piston rod being movable through the cap and formed with a handle at its opposite end, one of two perforated plates spaced from the plunger piston on the piston rod. The perforated disc is biased by a spiral coil spring from the plunger and may be further biased from a second perforated disc. When the discs and plunger are compressed together, any product between them is squeezed out through their holes.

17 Claims, 2 Drawing Sheets

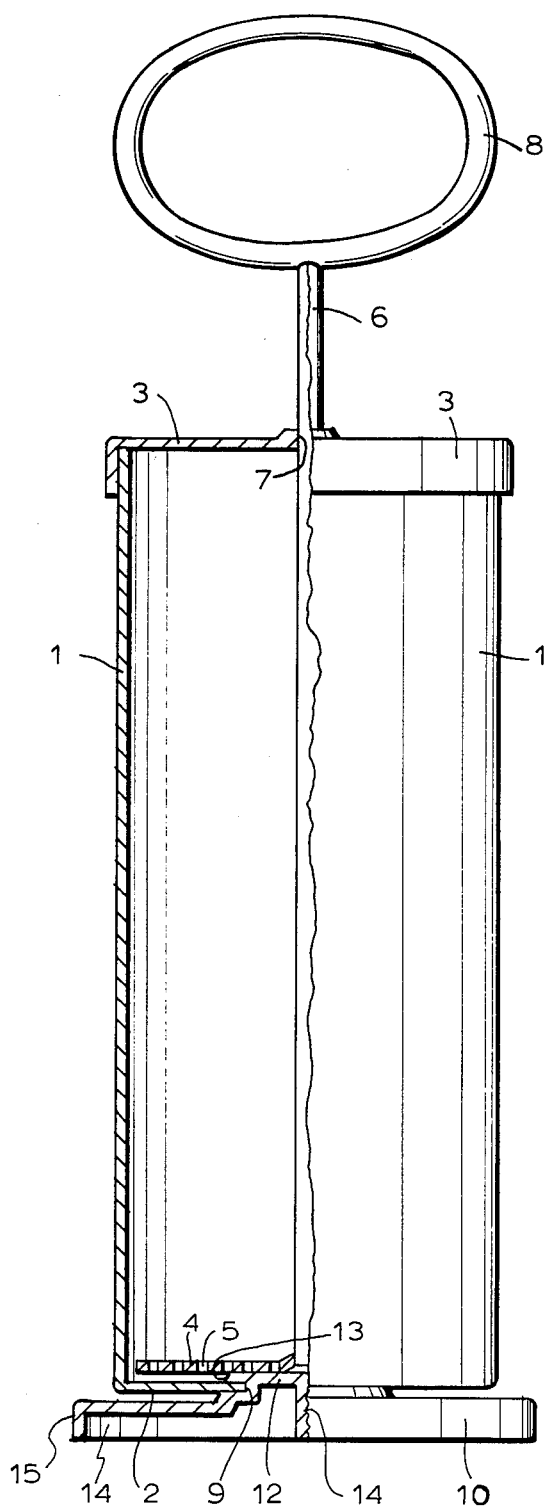
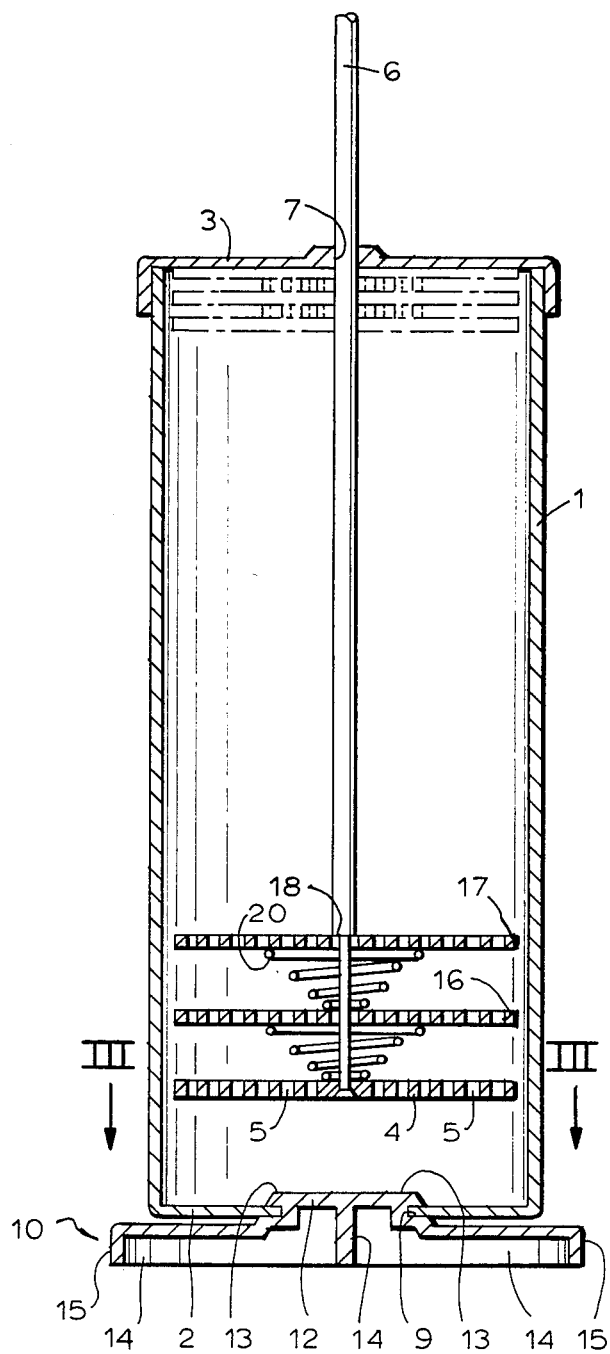

FIG. 3
FIG. 4
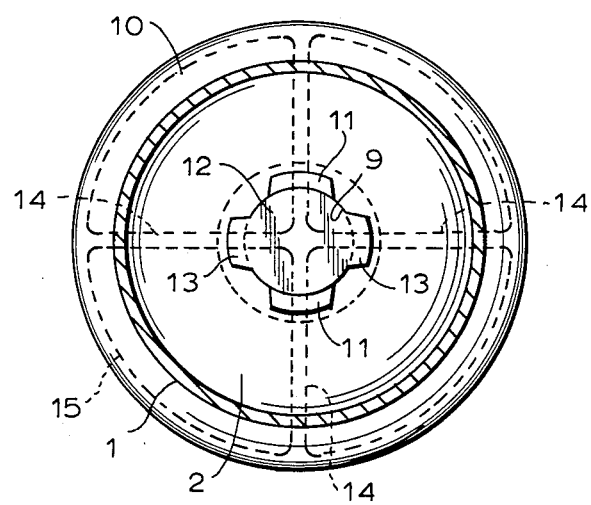
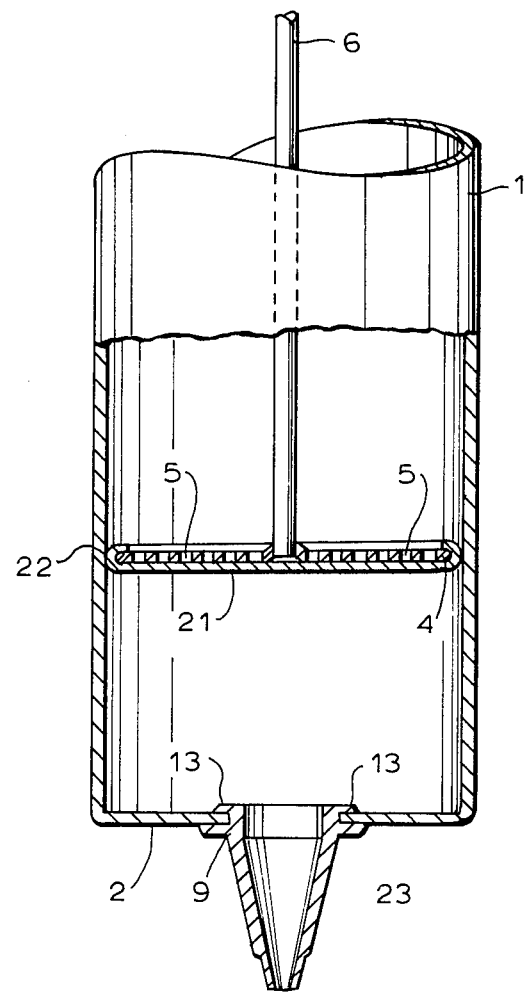

DEVICE FOR WHIPPING CREAM OR EGG WHITES OR FOR PREPARING MAYONNAISE

FIELD OF THE INVENTION

The present invention relates generally to a hand-powered device for whipping cream or egg whites or for preparing mayonnaise.

BACKGROUND OF THE INVENTION

A device for whipping cream is known which is cup-shaped with a uniform cross-section over its entire length, such as a circular cross-section. A cap releasably closes the upper housing port. A plunger piston, having a plurality of axially parallel holes, is axially movable by a piston rod. The plunger piston moves within a circumferential clearance from the housing. The piston rod passes through an accomodating slide rod bore in the cap and terminates outside the housing into a handgrip handle. A closable discharge opening is arranged at the bottom of the housing. The piston rod has a length sufficiently long so that the plunger piston can be supported by the housing bottom.

With such an arrangement, the cream or similar product does not lend itself to a rapid whipping. Thus, the complete discharge from the housing is problematic.

SUMMARY OF THE INVENTION

It is the object of the present invention to improve the whipping process and yet still achieve a complete discharge from the housing.

In keping with this object, and others which will become apparent hereafter, one aspect of the invention resides, briefly stated, in a manually operated device for whipping cream or egg whites and for preparing mayonnaise. Such a device has a housing to contain a product, means for whipping the product in the housing and including a plunger piston having a plurality of holes, and at least one plate having a plurality of holes and at least one plate being axially spaced from the plunger piston and axially movable relative to the latter.

As descrbed, the invention accomplishes the task of improving the whipping process and achieving a complete discharge. The solution lies in that there is provided one, preferably two, perforated discs, which are spaced away from the plunger piston on the piston rod. The discs are arranged one from another and are, for example, axially movable against, and limited by, spring tension.

This arrangement has the advantage in that a beated or whipped product located between perforated discs and the plunger piston can be expelled from this intermediate space by abutment of the perforated discs together against the plunger piston and against the innerside of the housing cap; for which purpose, however, the piston must be withdrawn.

Another advantage results when the coil springs are formed as conical springs. Specifically, the inner diameter of a respective subsequent winding is greater than the outer diameter of the previous small winding. In this manner, when a coil spring is fully compressed, its axial length becomes equivalent to the thickness of a winding.

Further, it is advantageous because the perforated discs have coaxial indentations which accommodate the coil springs entirely in their compressed state.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a device, for example for whipping cream, in the front view partially broken up.

FIG. 2 shows a further embodiment in longitudinal view.

FIG. 3 shows a cross-sectional view taken across section lines III—III of FIG. 2.

FIG. 4 shows a variation of the same essentially in a longitudinal view.

DETAILED DESCRIPTION OF THE PREFERRED EMBODIMENT

Referring now to the drawings, FIG. 1 shows the device as having a substantially cup-shaped, cylindrical housing 1 with a preformed bottom 2. The longitudinal axis of the housing 1 is perpendicular to the preformed bottom 2. A cap 3 releasably locks the upper opening of the housing. A plunger piston 4 is formed with a plurality of axially parallel holes 5. A piston rod 6 is cylindrical and is arranged coaxial with respect to the housing 1 and to the plunger piston 4. The piston rod 6 is movable axially through a slide-rod bore 7. The piston rod 6 has a preformed, ring-shaped handle 8 at an end outside the housing 1. The handle 8 is oval and larger than the size of a hand.

The plunger piston 4 has a diameter around 3 mm less than the inside diameter of the housing 1 so that the plunger piston 4 is arranged over its entire circumference with a 1.5 mm clearance with the inner side of the housing.

A discharge opening 9 is centrally located in the housing bottom 2, which, with its being constructed as a cover-like base plate, is releasably locked by a locking part 10.

The locking part 10 is releasably connected to the housing bottom 2 in a fashion similar to a bayonet catch. In addition, the circular-shaped discharge opening 9 has two diametrally arranged notch openings 11. On the locking part's 10 side facing the bottom, there is a preformed plug 12 inserted into the discharge opening 9. Projections 13 protrude from the inserted plug 12 radially. These projections 13 take hold of the rim of the discharge opening 9 from behind.

In order to guarantee a tight-sealing abutment of the locking part 10 against the outer side of the housing bottom 2, there are formed two ramps (not shown) which follow the edge of the discharge opening 9 inside of the housing and which rise in the peripheral and axial directions.

Outside of the locking part 10 are two raised, right-angled intersections and preformed cross-bars 14 which determine a handle. The cross-bars 14 are surrounded by a preformed cuff-like edge 15. Under the circumstances, it is especially advantageous in that the locking part 10 is formed as a cap which surrounds the outside of the housing 1.

According to FIG. 2, the piston rod 6 of the plunger piston 4 adjoins two perforated discs 16 and 17 to the piston rod 6. The discs 16, 17 are limited in their axial movement. The upper perforated disc 17 is supported in the axial direction by a collar 18 of the piston rod 6. Coil springs 19 and 20, constructed as conical spiral springs, are arranged biasing respectively between the plunger piston 4 and the perforated disc 16 and between both perforated discs 16 and 17. The piston rod 6 extends through the coil springs 19 and 20 from the side facing the plunger piston 4 and supports the perforated discs 16 and 17.

The conical spiral-shaped coil springs 19 and 20 are so constructed that each successive winding that all the windings could become compressed in a common plane. The compressed condition of the coil springs 1 and 20 is shown with broken lines towards the top of FIG. 2, showing the least possible overall height they can have.

Further, the perforated discs 16 and 17 could be formed with an indentation for receiving the coil springs 19 and 20. When the perforated discs become pressed together, the coil springs 19, 20 would then disappear into the contour of the perforated discs 16, 17.

According to FIG. 4, a releasably attached cover 21 seals the holes 5 in the plunger piston 4. The cover 21 has a preformed cuff 22 which envelops the circumference of the plunger piston 4.

It is advantageous where the circumferential side of the plunger piston 4 is curve-shaped and the cuff 22 is shaped conforming to the circumferential side of the plunger piston 4.

The cover 21, together with the cuff 22, are composed of soft elastic material and are detachably connected to the plunger piston 4. Moreover, the cuff 22 of the cover 21 seals the inner side of the housing 1.

Here, a nozzle 23 is exchanged for the locking part 10 and attached to the discharge opening. The nozzle 23 has the same locking mechanism as the locking part 10, namely a bayonet-like catch.

All parts, with the exception of the piston rod 6, are manufactured out of synthetic resin or plastic. It has been further found to be advantageous where the housing has a diameter of about 7 cm and a length of about 17 cm.

It will be understood that each of the elements described above, or two or more together, may also find a useful application in other types of manually operated devices for whipping cream and other products differing from the types described above.

While the invention has been illustrated and described as embodied in a manually operated device for whipping cream and other products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for the various applications without omitting features that, from the standpoint of prior art, fairly constitute essential characteristics of the generic or specific aspects of this invention.

What is claimed is new and desired to be protected by Letters Patent is set forth in the appended claims.

1. A device for whipping a product, comprising:
a housing to contain said product;
means for whipping said product in said housing and including a plunger piston having an axis and a plunger disc perpendicular to said axis, said plunger disc having a plurality of holes passing therethrough;
at least one plate having a plurality of holes and being axially spaced from said plunger disc and axially movable relative to the latter; and
means for biasing said plate relative to said plunger disc, said biasing means being arranged between said plate and said plunger disc, at least one of said plate and said plunger disc having an indentation formed to accomodate said biasing means in a fully compressed condition so that said plate and said plunger disc are in contact with each other when said biasing means is in said fully compressed condition to thereby effect a full explusion of the whipped product from between said plate and said plunger disc.

2. The device as defined in claim 1, wherein said plunger piston also includes a piston rod fixed to said plunger disc.

3. The device as defined in claim 2, wherein said housing is cup-shaped and has an open end; further comprising:
a cap closing said open end of said housing, said piston rod being axially movable through said cap.

4. The device as defined in claim 3, wherein said cap releasably engages said housing.

5. The device as defined in claim 2, wherein said piston rod is movable through said housing and has a portion formed as a handle outside of said housing.

6. The device as defined in claim 2, wherein said housing has a bottom and a top, said piston rod being movable through said top of said housing, said piston rod having a length long enough so that said plunger disc is movable to a closed position in which said plunger disc is supported by said bottom.

7. The device as defined in claim 1, wherein said housing has a length and a cross section which is uniform over its entire length.

8. The device as defined in claim 1, wherein said housing has a circular cross-section and said plate is disc-shaped.

9. The device as defined in claim 1, further comprising:
an additional plate having a plurality of holes and being arranged between said first mentioned plate and said plunger disc and spaced from said first mentioned plate and said plunger disc.

10. The device as defined in claim 9, wherein said first mentioned plate, said additional plate and said plunger disc each have a disc shape of equal diameter and are all coaxial with each other.

11. The device as defined in claim 8, wherein said additional plate is axially movable relative to said plunger disc.

12. The device as defined in claim 11, further comprising:
means for biasing said additional plate relative to said plunger disc; and
additional means for biasing said additional plate relative to said first mentioned plate.

13. The device as defined in claim 12, wherein said biasing means and said additional biasing means each include a conical coil spring, each of said springs having a plurality of windings of a diameter increasing in an axial direction.

14. The device as defined in claim 13, wherein each of said windings have an inner and an outer diameter such that said inner diameter of a subsequent one of said windings is greater than said outer diameter of a previous one of said windings.

15. The device as defined in claim 1, wherein said housing has a bottom end with an opening, said opening being openable for discharging said product and closeable for whipping said product, said plunger disc having a side facing said opening, further comprising:
   a cover engagable on said side of said plunger disc to block said plurality of holes in said plunger disc so that said product is dischargable through said opening by said compressing means.

16. The device as defined in claim 15, further comprising:
   at least one member releasable engagable with said bottom opening.

17. The device as defined in claim 16, wherein said opening has at least one notch, said member having an extended portion with at least one projection such that said extended portion and said projection fit into said opening and said notch respectively.

* * * * *